United States Patent [19]

Schulz et al.

[11] Patent Number: 4,621,982
[45] Date of Patent: Nov. 11, 1986

[54] DOUBLE PUMP

[75] Inventors: René Schulz, Neu-Anspach; Heinrich J. Braum, Bad Homburg; Kurt Nadolny, Erdmannhausen; Van-Trung Nguyen, Stuttgart, all of Fed. Rep. of Germany

[73] Assignees: Vickers System GmbH, Bad Homburg; Daimler-Benz Aktiegesellschaft, Stuttgart, both of Fed. Rep. of Germany

[21] Appl. No.: 797,187

[22] Filed: Nov. 12, 1985

Related U.S. Application Data

[63] Continuation of Ser. No. 620,878, Jun. 15, 1984, abandoned.

[30] Foreign Application Priority Data

Jun. 18, 1983 [EP] European Pat. Off. ........ 83105969.6

[51] Int. Cl.[4] .......................... F04B 23/14; F16B 7/18
[52] U.S. Cl. .................................... 417/201; 417/319; 403/2
[58] Field of Search ............... 417/319, 206, 201, 273; 418/69; 403/2

[56] References Cited

U.S. PATENT DOCUMENTS

| | | | |
|---|---|---|---|
| 2,393,175 | 1/1946 | Laskey | 417/273 |
| 2,572,388 | 10/1951 | Redpath | 417/319 |
| 2,605,707 | 8/1952 | Worlidge | 417/206 |
| 3,871,793 | 3/1975 | Olson, Jr. | 417/319 |
| 3,912,421 | 10/1975 | Gelin | 417/273 |
| 3,945,766 | 3/1976 | Gelon | 417/319 |

Primary Examiner—Cornelius J. Husar
Assistant Examiner—Peter M. Cuomo
Attorney, Agent, or Firm—Barnes, Kisselle, Raisch, Choate, Whittemore & Hulbert

[57] ABSTRACT

A main pump (rotary vane pump 1) and a secondary pump (radial piston pump 2) are driven by way of a common shaft (3), a cam ring (30) being used to drive the secondary pump. The cam ring is coupled to the shaft (3) by way of a shear pin (33). If the auxiliary pump locks, the shear pin fractures and the cam ring (30) can rotate relative to the shaft (3). In that case, the fracture portions of the shear pin (33) are driven into their respective bores (34, 35), thereby avoiding excessive friction and overheating. Therefore, the main pump can continue to operate in spite of the failure of the auxiliary pump.

7 Claims, 2 Drawing Figures

FIG.1

DOUBLE PUMP

This application is a continuation of application Ser. No. 620,878, filed June 15, 1984 abandoned.

BACKGROUND OF THE INVENTION

The invention relates to a double pump including a main pump and a secondary pump which are driven by way of a common shaft, and in particular to a rotary vane pump as the main pump and a radial piston pump as the secondary pump. Still more specifically, the invention relates to the shaft of the double pump having a cam for driving the secondary pump.

A double pump of that kind is known from U.S. Pat. No. 2,605,707 to R. F. Worlidge, the cam being keyed on the shaft and supporting on its outer surface a needle roller bearing journalling a rotary ring which drives the pistons of a radial piston pump. If one of these pistons is jamming, the radial piston pump fails as a whole, and it may happen that the drive shaft is locked so that the further rotary pump also fails. Such double failure can be disastrous in vehicle applications.

SUMMARY OF THE INVENTION

It is therefore a general object of the invention to overcome this disadvantage of the prior art.

More particularly, it is an object of the invention to provide a double pump, the main pump thereof continuing to run even if the secondary pump fails. Still another object is to avoid heat production when the secondary pump fails.

In keeping with these objects and with others which will become apparent thereafter, one feature of the invention resides in a shear means which breakes in the event of failure of the secondary pump. If the secondary pump should lock up, for example due to a piston seizing, the shear means is sheared between an inner rotational surface of the cam which takes the form of a ring and an outer rotational surface of the shaft; the cam ring of the secondary pump can slide on the outer surface of the shaft. The fracture surfaces of the shear means will only slightly deviate from that outer surface so that only small raised portions of the fracture members will project into or out of the rotational outer surface. In such condition, when the shaft still rotates relative to the cam ring held stationary by locked secondary pump, the above-mentioned projecting portions impinge against each other and are pushed back into corresponding retraction or withdrawal spaces provided for that purpose. This happens very quickly, since only a small number of consequential contacts between the fracture surface are needed. Therefore, heat production is avoided which might cause seizure of the shaft bearings. The proposed construction requires only a small amount of space and gives rise to only slight additional production costs.

As viewed from the driven end of the shaft, the secondary pump should be arranged in front of the main pump. That is the case in particular when the main pump comprises a vane pump and the secondary pump comprises a radial piston pump. In that case, the vane pump may be disposed at the end of the shaft which is remote from the driven end while the radial piston pump is disposed in the middle region of the shaft. The bearings and the outer surface of the shaft engaging the inner surface of the cam ring can be lubricated from leakage oil delivered by the main pump through axial bores in the shaft.

The simplest form of shear means is a cylindrical shear pin which is driven as a press fit into aligned radial bores in the cam ring and the shaft, the length of the bores being somewhat larger than the length of the shear pin. The shear pin may also have a desired fracture location thereon.

An embodiment of the invention is described with reference to the drawings.

BRIEF DESCRIPTION OF THE DRAWINGS

Figure 1:
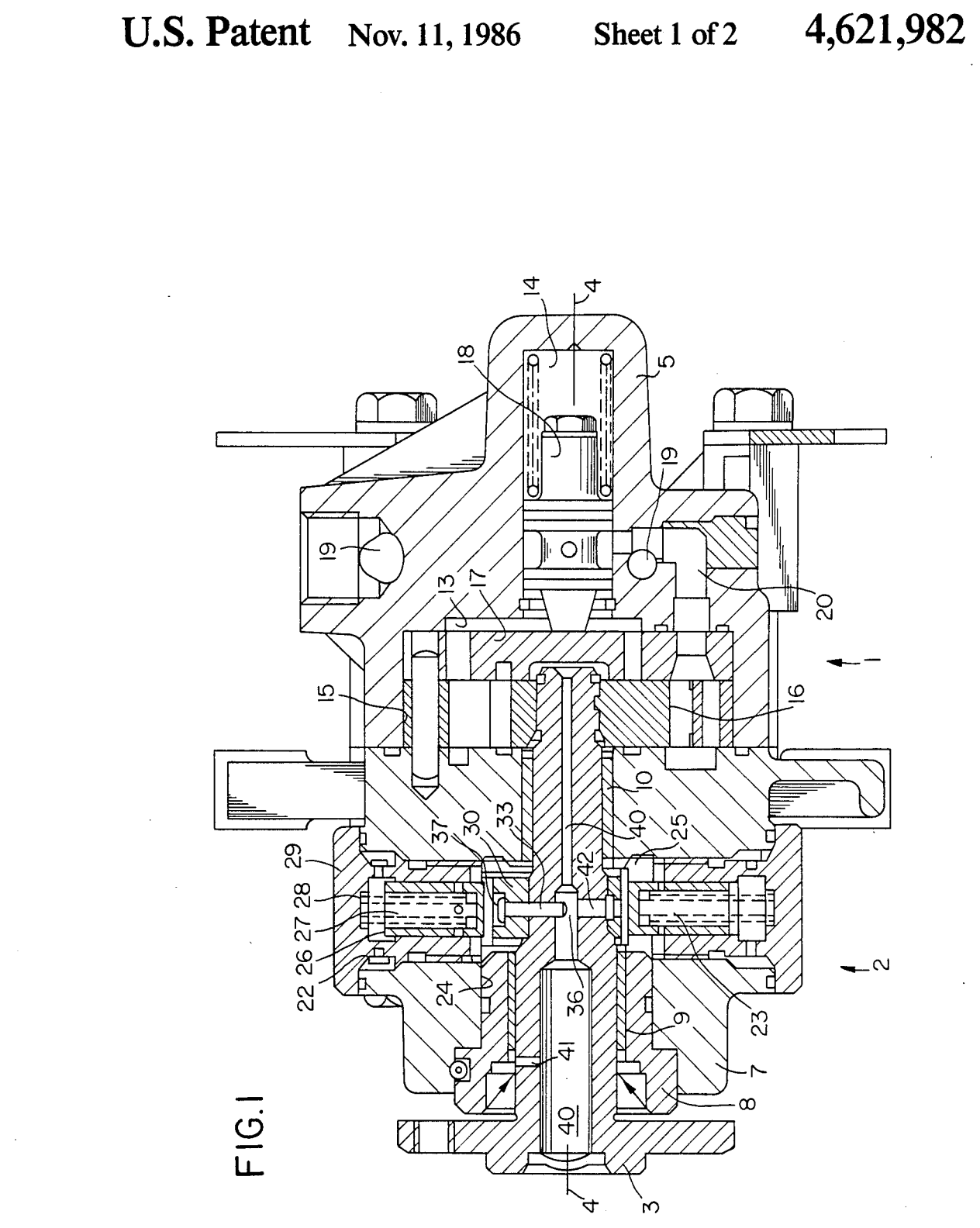

FIG. 1 shows a view in longitudinal section in a vertical and a horizontal plane through the double pump consisting of a vane pump and a radial piston pump.

DESCRIPTION OF THE PREFERRED EMBODIMENTS

Figure 2:
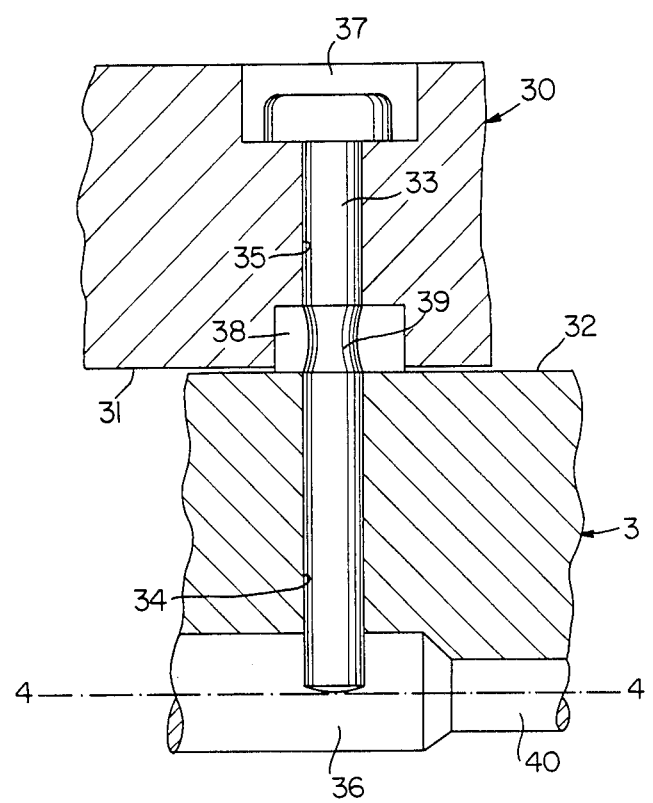
FIG. 2 shows a shear means as a detail on FIG. 1 on an enlarged scale.

The double pump includes a vane pump 1 as the main pump, a radial piston pump 2 as the secondary pump and a common shaft 3 for driving the two pumps 1 and 2. Above the axis of rotation as indicated at 4—4, the section is in a vertical plane while below the axis 4—4, the section is in a horizontal plane. The arrangement has a cup-shaped housing portion 5 for accommodating the vane pump 1 and a cover-shaped housing portion 7 for accommodating the radial piston pump 2 as well as a bearing and sealing sleeve member 8 having a slide bearing 9. A further slide bearing 10 for the shaft 3 is provided in housing portion 7.

The housing portion 5 comprises spaces or chambers 13 and 14 which are arranged concentrically with the axis of the arrangement and which communicate with each other. Fitted into the chamber 13 is a unit which includes a cam ring 15, a rotor 16 and a pressure plate 17. The rotor 16 has radial slots in which vanes are guided. The vanes are guided through sickle-shaped working chambers disposed between the rotor 16 and the cam ring 15. Disposed in the chamber 14 is a flow control valve 18 which in the interior thereof may possibly also contain a pressure relief valve (not shown). The housing portion 5 also has inlet and outlet ducts for supplying the hydraulic fluid, of which the drawing shows only parts of vertical inlet ducts 19 which extend to the right and to the left of the flow control valve 18 and which open into horizontal, elbow-bent ducts 20 which lead to the inlet ports of the working chambers of the pump (U.S. Pat. No. 4,470,768 to Konz shows further details of the duct configuration and is incorporated by reference).

The housing portion 7 has a stepped bore 24 for accommodating the member 8 and the bearings 9 and 10. A space 25 remains between the member 8 and the bearings 9 on the one hand, and the bearing 10 on the other hand, with the heads of pistons 26 projecting into space 25. The pistons 126 are disposed radially with respect to the shaft 3 and each includes an internal space 27 in which a spring 28 is arranged.

Each spring 28 bears against a cover member 29 and urges the associated, hollow-bored piston 26 towards an eccentric or cam ring 30. The cam ring 30 represents an annular member which has an inner rotational surface 31 (see FIG. 2) which is concentric with respect to the axis 4. The inner surface 31 bears against a corresponding outer cylindrical surface 32 on the shaft 3. A shear means in the form of a shear pin 33 bridges across and connects the two surfaces 31 and 32. In that arrangement, the front end of the shear pin 33 is engaged with a press fit into a bore 34 in the shaft 3 while the rearward end is also fitted in a bore 35 in the cam ring 30. The bore 34 opens into a retraction or withdrawal chamber 36 while the bore 35 opens into a retraction or withdrawal chamber 37, the chambers 36 and 37 serving to receive the base portion and the head portion respectively of the shear pin 33 after it has fractured.

In a modification, the shear pin 33 is made shorter than shown in FIG. 2 and does not fill out the bores 34 or 35 so that there is at least one space left in which one fractured piece of the shear pin 33 can retract.

Also provided in the shaft 3 is a longitudinal bore 40 which connects the inner end of the shaft 3 to a radial bore 41, in order to supply the bearing 9 with oil. A further radial bore 42 in the shaft 3 communicates with an annular groove 38 and serves to supply lubricant to the inner rotational surface 31 of the cam ring. In particular leakage oil from the rotary vane pump 1 accumulates in the ducts 40 to 42, and is thus usefully employed for lubrication purposes.

The intermediate space 25 has a communication to an oil tank and represents the suction chamber of the radial piston pump 2. In the inward, extended position of the pistons 26, the chambers 27 communicate with the space 25 by way of inlet bores 23 so that the hydraulic oil which is to be conveyed can pass into the respective chamber 27. When the respective piston 26 moves radially outwardly, the corresponding inlet bore 23 is closed. Upon further radially outward movement of the piston, the compressed oil passes by way of non-return valves 22 into a pressure outlet duct.

If one of the pistons 26 seizes, a very high reaction torque is generated in the shaft 3. If the force involved exceeds the shearing force of the shear pin 33, the shear pin 33 fractures, more specifically, in the vicinity of the surfaces 31 and 32. However, it is not possible to expect the fracture surface precisely to follow the rotational surfaces 31, 32. Certain points will always project beyond the rotational surface 31 or 32, at the fracture surface of the shear pin. The projecting points on the radially inward fracture portion of the shear pin 33 come into contact with the surface 31 of the cam ring 30 and are pressed inwardly while the radially outward fracture portion is pressed outwardly by the surface 32. Those events take place within a few revolutions of the shaft 3 so that the amount of heat which is expected to be generated when the above-mentioned safeguard situation occurs remains moderate and does not result in further damage to the radial piston pump 2. It should be noted that the rotary vane pump 1 can continue to operate undisturbed.

Instead of a shear pin or shear bolt 33, the shear means may also be of a different form. The important consideration is that, in the safeguard situation, the fractured portions of the shear means can move back a little from the rotational surfaces 31 and 32.

The driver can be warned that the radial piston pump 2 has failed, by a display lamp being illuminated. The damage can be easily remedied by replacing the shear pin 33.

In FIG. 2 an annular groove 38 is provided in the cam ring 30 following the radial plane in which the shear pin 33 is arranged. The shear pin has a waisted portion or construction or desired fractured location 39 which is within the annular groove 38. When accordingly in the safeguard situation, the shear pin 33 fractures, the two fractured pieces of the shear pin 33 only strike against each other a few times until they are displaced by each other into their respective bores 34 and 35 so that the shaft 3 can rotate in an entirely unimpeded manner. The embodiment shown in FIG. 2 is therefore particularly desirable.

It will be understood that it is sufficient for one fractured piece to be displaced when the desired result is obtained, i.e. avoiding further strike blows of the fractured pieces.

While the invention has been illustrated and described as embodied in a combined radial piston and vane pump, it is not intended to be limited to the details shown, since various modifications and structure changes may be made without departing in any way from the spirit of the present invention.

We claim:

1. A double pump including
   a main pump,
   a secondary pump,
   a shaft for driving both the main pump and the secondary pump and defining a rotational axis,
   cam ring means arranged to drive said secondary pump and having an inner surface coaxial to said rotational axis,
   said shaft having an outer surface coaxial to said rotational axis and cooperating with said inner surface of said cam ring means,
   a first bore extending transversely in said shaft in said outer surface,
   a first retraction space provided in said shaft so as to register to said first bore,
   a second bore extending transversely in said cam ring means in said inner surface,
   a second retraction space provided in said cam ring means so as to register to said second bore,
   said first and second bores being aligned to one another and
   safety shear means inserted in said first and second bores and mounting said cam ring means on said shaft,
   at least one of said first and second retraction spaces, in the event of fracture of said shear means, provide a space wherein a fractured piece of said shear means can partially withdraw.

2. The double pump set forth in claim 1 wherein said cam ring means has an annular groove in said inner surface and said shear means has a desired fracture location which is arranged within said annular groove.

3. The double pump set forth in claim 1 wherein said shear means comprises a shear pin, said shear pin being of a cylindrical configuration within said first bore in said shaft.

4. The double pump set forth in claim 1 wherein said shaft has a third longitudinal bore and a fourth radial bore, said third longitudinal bore being supplied with oil from said main pump and connected to said inner and outer surfaces by way of said fourth bore.

5. The double pump set forth in claim 4 comprising a sliding bearing or journalling said shaft, wherein said shaft has a fifth radial bore which is connected to said third longitudinal bore, said third and fifth bores providing supply of oil to said sliding bearing.

6. The double pump set forth in claim 3 wherein said first bore in said shaft is longer than said cylindrical configuration of said shear pin within said first bore.

7. A double pump including
   a main pump, a secondary pump, a shaft for driving both the main pump and the secondary pump and defining a rotational axis, cam ring means arranged to drive said secondary pump and having an inner surface coaxial to said rotational axis, said shaft having an outer surface coaxial to said rotational axis and cooperating with said inner surface of said cam ring means, a first bore extending transversely in said shaft in said outer surface, a second bore extending transversely in said cam ring means in said inner surface, said first and second bores being aligned to one another, and safety shear means inserted in said first and second bores so as to leave free at least one space in said bores, said shear means mounting said cam ring means on said shaft, wherein in the event of fracture of said shear means, said space provides a retraction space for a fractured piece of said shear means to partially withdraw.

* * * * *